United States Patent [19]
Gilliam

[11] Patent Number: 5,090,870
[45] Date of Patent: Feb. 25, 1992

[54] METHOD FOR FLUENT MASS SURFACE TEXTURING A TURBINE VANE

[76] Inventor: Glenn R. Gilliam, 310 Lake St., #104, Huntington Bea... Calif. 92648

[21] Appl. No.: 424,536

[22] Filed: Oct. 20, 1989

[51] Int. Cl.⁵ ............................. F01D 5/00; B24B 1/00
[52] U.S. Cl. .................. 416/241 R; 29/889.1; 29/889.7; 29/527.1; 29/402.04; 51/163.1; 51/164.1; 51/317
[58] Field of Search ............ 415/200; 416/223 R, 416/223 A, 241 R; 29/889.1, 889.7, 889.6, 402.04, 527.1; 51/164.5, 7, 163.1, 163.2, 164.1, 317, 318

[56] References Cited

U.S. PATENT DOCUMENTS

| | | | |
|---|---|---|---|
| 2,947,124 | 8/1960 | Madigan et al. | 51/164.5 |
| 3,576,070 | 4/1971 | Parsons | 416/241 R |
| 3,808,747 | 5/1974 | Kenagy | 51/164.5 |
| 3,981,616 | 9/1976 | Stargardter et al. | 416/241 R |
| 4,249,913 | 2/1981 | Johnson et al. | 416/241 R |
| 4,428,213 | 1/1984 | Neal et al. | 416/223 R |
| 4,741,973 | 5/1988 | Londit et al. | 416/228 |

FOREIGN PATENT DOCUMENTS

| | | | |
|---|---|---|---|
| 247503 | 10/1960 | Australia | 51/164.1 |
| 1913348 | 9/1970 | Fed. Rep. of Germany | 51/164.2 |
| 0173459 | 10/1982 | Japan | 51/164.1 |
| 0259766 | 11/1987 | Japan | 51/164.1 |
| 1397257 | 5/1988 | U.S.S.R. | 51/164.1 |

OTHER PUBLICATIONS

Hignett, J. Bernard, *Metal Finishing*, "The Versatility of Centrifugal Barrell Finishing", The Harper Buffing Machine Co., East Hartford, CT, Feb. 1980.
Compressor Blades, *JT8D Engine Manual* (*PN* 481672), Pratt & Whitney Aircraft, Feb. 1984.

*Primary Examiner*—Edward K. Look
*Assistant Examiner*—Hoane Nguyen
*Attorney, Agent, or Firm*—Knobbe, Martens, Olson & Bear

[57] ABSTRACT

An apparatus and method for providing vanes with a surface texture of less than $10 \times 10^{-6}$ inches rms. The method employs a fluent mass having a particulate size less than 1.5 inches and abrasive materials in a centrifugal barrel to achieve a surface texture between $11-27 \times 10^{-6}$ inches rms. A refinement cut employs a finer abrasive and a cycle time of less than 30 minutes to provide a burnished surface texture of between $5-8 \times 10^{-6}$ inches rms. A final coloring cycle, employing only a coloring compound, is employed to provide a highly reflective surface texture between approximately $4-7 \times 10^{-6}$ inches rms.

39 Claims, 4 Drawing Sheets

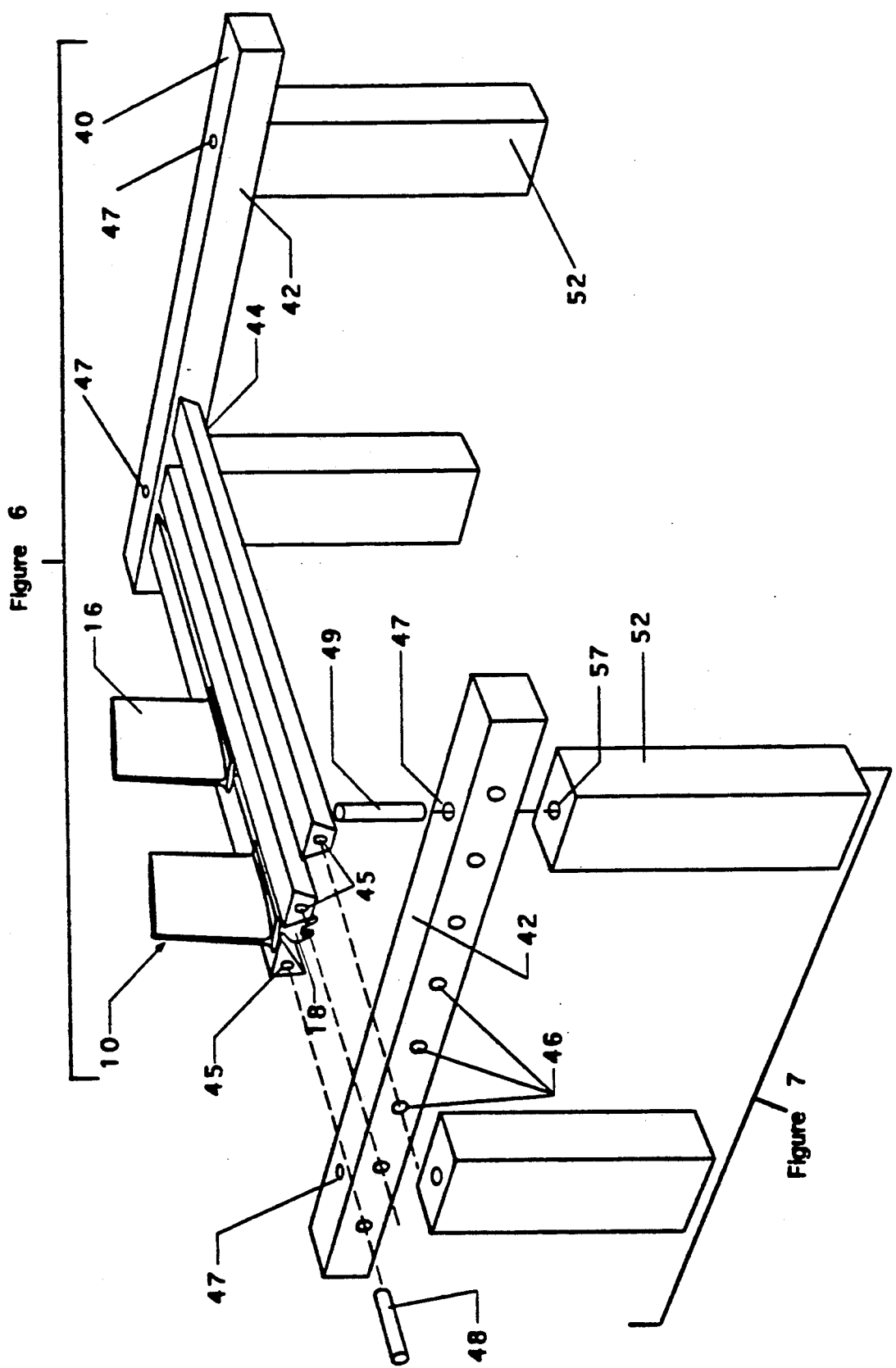

5,090,870

METHOD FOR FLUENT MASS SURFACE TEXTURING A TURBINE VANE

FIELD OF THE INVENTION

This invention relates to fluent mass surface texturing, and more particularly to a method for employing a fluent mass to produce a surface texture of 4-7 microinches rms on a vane.

BACKGROUND OF THE INVENTION

The increased complexity and precision requirements of mechanical products has enhanced the need for accurately producing and controlling the surface texture of the manufactured parts. Variations in the surface texture can influence a variety of performance characteristics of the part. The surface texture can affect the ability of the part to resist wear and fatigue; to assist or destroy effective lubrication; to increase or decrease friction and/or abrasion with cooperating parts; and to resist corrosion. As these characteristics may become critical under certain operation conditions, the surface texture can dictate the performance and integrity of the component.

Distinct surface textures may be achieved through a variety of processes including tumbling, vibrating, honing, lapping, polishing, turning, milling and grinding. Metal objects such as stainless steel and aluminum have been tumbled or vibrated to remove burrs, clean, burnish and color the workpiece.

To accomplish these results through the tumbling or vibrating process, the prior art has manipulated the tumbling or vibrating material, the speed and the duration of the working period. Typically, parts having a relatively small size in relation to the barrel are processed loose within the tumbling or vibratory material. However, in the tumbling process, workpieces having a relatively large size in relation to the centrifugal barrel are usually fixed within the barrel so that the workpiece is not damaged by contact with the barrel or other workpieces during the tumbling process. In addition, the prior art tumbling and vibratory processes have included both dry and wet processes, typically employing rotational speeds from 12-25 rpm for the tumbling process or high frequency oscillations in the vibrating process. The operating time, while governed by the amount of tumbling or vibrating action desired, ranges from 1-8 hours.

The application of surface texturing techniques is especially critical in the surfaces of vanes, such as those used in turbines, jet engines or turbomachinery. The vanes in these applications are employed at extremely high rotational speeds which produce substantial internal stresses and forces within the vane. Under these operating conditions, a defect in the surface texture may propagate to produce a fracture which may result in a failure of the vane. The failure of a vane during operating conditions results in an uncontrolled high velocity mass. Such an uncontrolled mass can inflict substantial damage to the surrounding structure and components, thereby rendering the entire unit inoperative, or severely damaged. Also, the surface texture may obscure or hide surface defects, thereby preventing detection of a flawed component. The use of flawed components substantially increases the risk of product fracture.

In addition, these vanes operate in high temperature environments which also induces stress on the vane. The operating temperature of the vane may be increased by the friction of the vane with the surrounding fluid, thereby further stressing the vane.

Although the general tumbling and vibrating processes are available, the vanes employed in jet aircraft engines are surface textured according to specifications set forth by the vane or engine manufacturer. The manufacturers require the finishing and refurbishment of blades in compliance with industry standard specifications. These specifications typically require that after the vane is milled, the surface is sanded with a belt sander. The edge radii are then hand blended to achieve an aerodynamic curvature. The vanes are shot peened and processed in a vibratory bowl for a period which may exceed 4 hours. In addition, an abrasive sand blasting prior to the vibratory bowl is also required by some manufacturers.

The processing of the vanes, as required by manufacturer's specifications, introduces a substantial risk to the integrity of the vanes. Specifically, the shot peening and vibratory bowl process tends to deform the surface in such a manner so as to hide surface cracks or defects. As these defects may later propagate into failures, the shot peening prevents an adequate quality control of the processed vanes. In addition, the vibratory bowl process typically induces damage to the leading or trailing edge of the vane in approximately 10-20% of the workpieces. If the damage to the vane is minimal, the vane is repaired by hand; however, if the damage is above a certain threshold, the entire vane must be discarded.

Further, as the vibratory bowl process typically lasts for 4 hours, the additional handling and processing necessary to satisfy the specifications is a time consuming and labor intensive process. In addition, the large amount of manual labor introduces a high percentage of inconsistent results. Further, the surface texture achieved by the specifications produces an undesirable resistance to a passing air flow, thereby increasing fuel consumption and operating temperature of the engine.

Therefore, a need exists for a non-degrading method and apparatus for surface texturing a vane. Further, a need exists for producing a surface texture which does not hide or conceal surface defects. The need also exists for a method which produces uniform and reproducible results without requiring substantial human intervention. The need exists for an apparatus and method for providing a vane with a surface texture which minimizes the resistance to fluid flow relative to the surface, thereby reducing operating temperatures and increasing efficiency of the vane. Finally, a need exists for a surface texturing process which does not require substantial processing times and materials.

SUMMARY OF THE INVENTION

A method and apparatus for producing a predetermined surface texture on a finished or unfinished vane is disclosed. The disclosed method employs a fluent mass media in a centrifugal barrel to produce the desired surface texture on the vanes.

The apparatus includes the centrifugal barrel which is preferably rotated about a plurality of axes; a rack for securing a plurality of vanes within the barrel; the fluent mass; a lubricating fluid; an abrasive material and a coloring compound.

The apparatus and method are preferably employed in three steps with respect to an unfinished belt sanded, or milled, vane. A rough cut, a refinement cut and color cycle are employed to transform a belt sanded or milled vane into a vane having a finished surface texture of less than $10 \times 10^{-6}$ inches rms. Alternatively, if the vane is only to be refinished or the existing surface texture is from approximately $11-27 \times 10^{-6}$ inches rms, the refinement cut and color cycle are employed to produce a surface texture of less than $10 \times 10^{-6}$ inches rms.

In the disclosed process, the vanes are preferably secured in the rack and disposed within the barrel. The fluent mass, lubricating fluid, abrasive material and coloring compound are then introduced into the barrel. Preferably, the abrasive material adheres to the surface of fluent mass so as to substantially coat the mass. The barrel is closed and rotated about the axes so that the fluent mass impinges the vanes. As the fluent mass impinges the vanes, the abrasive material is disposed between the fluent mass and the surface of the vane, thereby removing material from the surface of the vane in proportion to the energy imparted to the particulates of the fluent mass.

The abrasive material may be selected so as to provide sufficient abrasive action so as to remove material from the surface of the vane. Subsequently, the abrasive material is omitted, and the fluent mass is impinged with just the coloring compound which nominally abrades the vane so as to provide the desired surface texture of less than $10 \times 10^{-6}$ inches rms.

The surface texture achieved by the disclosed process is determined by a number of factors, including the rotation rate of the centrifugal barrel; the coarseness of the abrasive material; the coloring compound, the amount of lubricating fluid; the amount, size and density of the fluent mass; the fixturing of the vanes; the direction of the mass flow relative to the vanes; and the duration of the process.

Preferably, the factors are combined in the rough cut process to produce a vane having a surface texture of approximately $11-27 \times 10^{-6}$ inches rms, in a cycle time between 10 to 50 minutes. The duration of the rough cut process is a function of the surface texture of the vane prior to the rough cut. Typical vane tolerances may be satisfied through the rough cut process if the surface texture is approximately $125 \times 10^{-6}$ inches rms prior to initiation of the rough cut. However, the rough cut may be used to reduce a surface texture from approximately $400 \times 10^{-6}$ inches rms to $11-27 \times 10^{-6}$ inches rms.

Preferably, the refinement process abrades and burnishes the workpiece to provide a work hardened surface texture of approximately $5-8 \times 10^{-6}$ inches rms. If the rough cut is employed to provide a pre-refinement cut surface texture of $11-27 \times 10^{-6}$ inches rms, the refinement cut reduces the surface texture to approximately $5-8 \times 10^{-6}$ inches rms in approximately 10 minutes. The color cycle employs a coloring compound rather than an abrasive material to clean the surface so as to produce a highly reflective finish, thereby making surface defects readily visible. The use of the coloring cycle after the refinement cut produces the $4-7 \times 10^{-6}$ inches rms surface texture is approximately 5 minutes.

DETAILED DESCRIPTION OF THE DRAWINGS

Figures 1, 2:
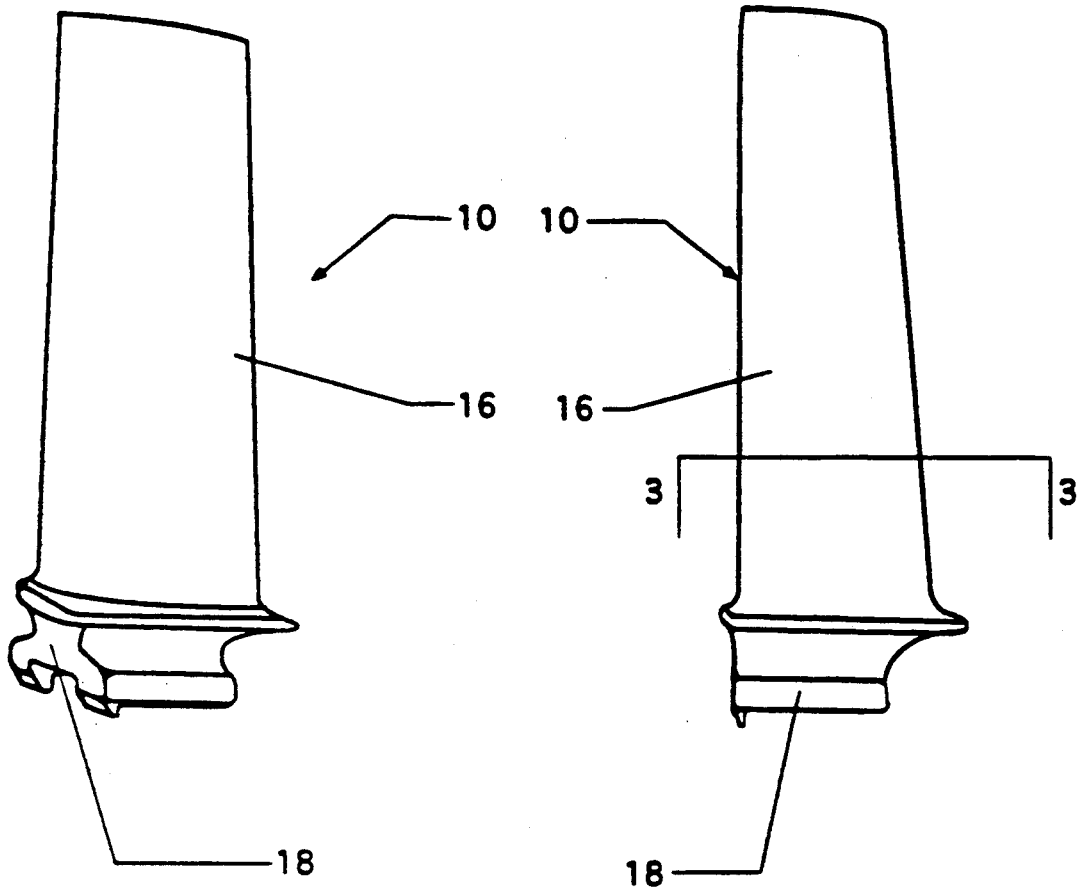
Figure 3:
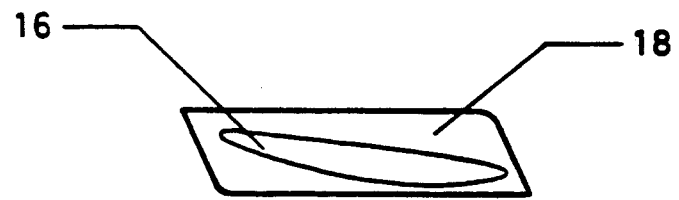
Figure 4:
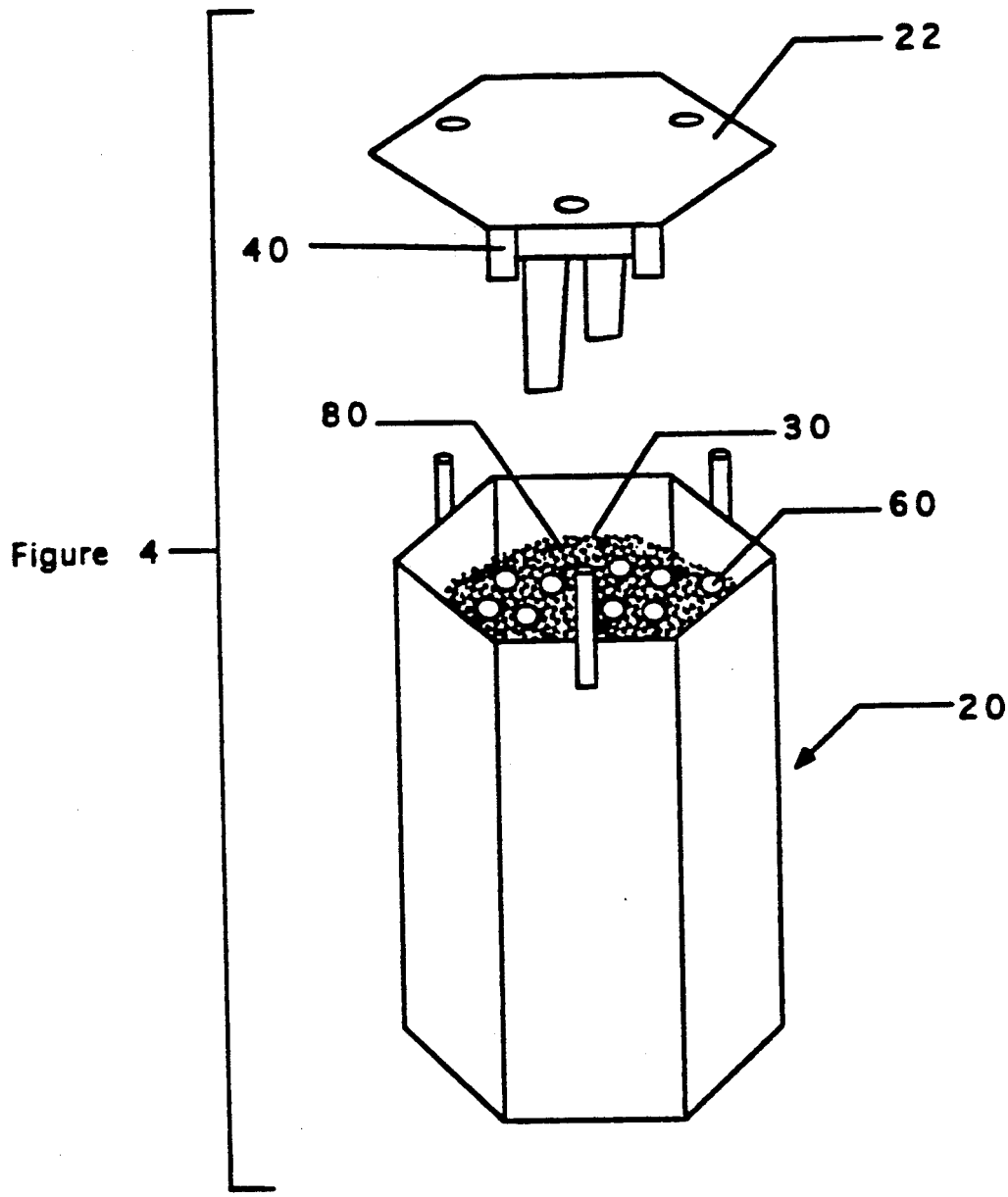
Figure 5:
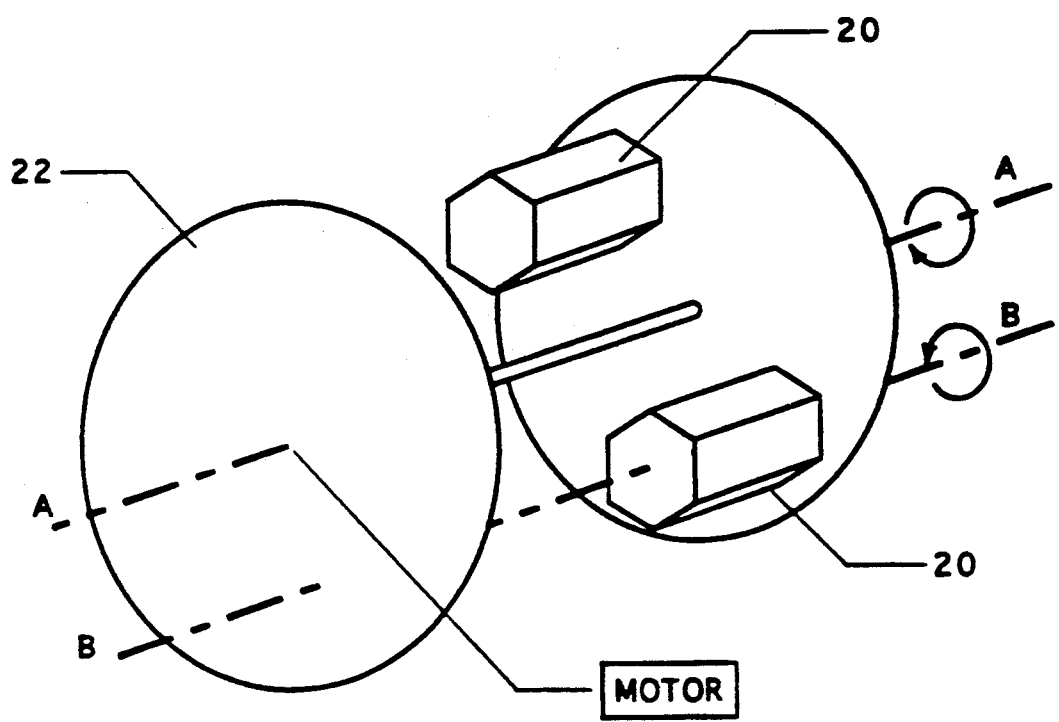

FIG. 1 is a perspective view of a jet engine vane.
FIG. 2 is an elevational side view of a jet engine vane.
FIG. 3 is a top view of a jet engine vane showing the orientation of the blade relative to the root.
FIG. 4 is an exploded perspective view of a centrifugal barrel.
FIG. 5 is a perspective view of a centrifugal barrel in a turret.
FIGS. 6 and 7 are exploded perspective views of a rack retaining a plurality of vanes.

DETAILED DESCRIPTION OF THE PREFERRED EMBODIMENT

The disclosed method and apparatus provide a surface texture of approximately $4-7 \times 10^{-6}$ inches rms to a vane 10 shown in FIG. 1. As described herein, the vane 10 may include those used in a propeller, impeller, turbine, compressor, jet engine or any other turbo machinery.

Referring to FIG. 1-3, the vane 10 includes a blade 16 having a flat or curved surface that is rotated about an axis by a fluid flow, or that rotates to cause a fluid to flow, or that redirects a flow of fluid. Preferably, the vane 10 also includes a root 18 integrally affixed to the blade 16. The root 18 is configured so as to engage a flange (not shown) attached to the axis about which the vane 10 is to rotate, thereby providing for retention of the vane 10 as it rotates about the axis.

The disclosed method includes three steps which are selectively employed to provide the desired surface texture of less than $10 \times 10^{-6}$ inches rms. The three steps include a rough cut, a refinement cut and a color cycle. Generally, the rough cut is employed on an unfinished vane 10 which has been milled or coarse sanded to the general configuration of the vane. Preferably, the rough cut is used to remove the coarse sand markings so as to provide a surface texture for approximately $11-27 \times 10^{-6}$ inches rms (110-270 millionths of an inch). However, if final manufacturing tolerances permit, it is possible to remove mill marks having a surface texture in the order of $400 \times 10^{-6}$ inches rms in the rough cut. The remaining two processes, the refinement cut and the color cycle, are used on previously finished blades, finished by either the rough cut or an alternative method, to provide a finished surface texture of approximately $4-7 \times 10^{-6}$ inches rms. Preferably, the refinement cut is employed on components having a surface texture of approximately $11-27 \times 10^{-6}$ inches rms. In addition, the refinement cut burnishes the work by imparting compressive stresses on the surface, thereby work hardening the vane 10.

The final cycle, the color cycle, is used to provide a highly reflective surface texture. The surface texture created by the color cycle has a reduced resistance to fluid flow. In addition, the surface texture produced by the color cycle provides for the detection of surface defects or flaws. Preferably, the color cycle is employed on vanes having a surface texture from $5-8 \times 10^{-6}$ inches rms to produce a surface texture approximately $4-7 \times 10^{-6}$ inches rms.

The apparatus for producing the surface texture includes a centrifugal barrel 20, a fluent mass 30, a rack 40, an abrasive material 60, a coloring compound 70, and a lubricating fluid 80.

CENTRIFUGAL BARREL

The centrifugal barrel 20 houses the rack 40, the fluent mass 40, the vanes 10, the lubricating fluid, and abrasive 60 and the coloring compound 70. Referring to FIG. 5, the barrel includes a lid 22 and bolts 24. The lid 22 includes apertures 23 sized to receive the bolts 24 so that nuts may be threaded onto the bolts 24 so as to secure and seal the lid 22 to the barrel. As shown in FIG. 5, the centrifugal barrel 20 is retained within a turret 22, which rotates about a first axis. As the turret 22 rotates about the first axis A, the barrel 20 rotates in the opposite direction within a second axis B within the orbit of the turret 22. Preferably, the turret 22 includes a plurality of barrels 20 so that multiple batches of vanes 10 may be concurrently processed. The centrifugal barrel 20 may be Control Velocity Model ® 1200, 1600 or 2000, as manufactured by Richwood Industries, Inc. of Garden Grove, Calif. Preferably, the opposing rotation rate of the barrel 20 about the second axis B is substantially equal to the rotation rate of the turret 22 about the first axis A as driven by the motor of FIG. 5. Therefore, the fluent mass 30 may be moved within the barrel 20 in a substantially predictable path. Although the disclosed method is described in terms of a straight rotation centrifugal barrel 20, a figure-eight barrel may also be employed.

Preferably, the rotational speed of the turret 22 may be varied over a spectrum of rotational velocities. It is preferable that the rotation rate of the turret 22 may be varied from 70-350 revolutions per minute.

Preferably, the turret 22 rotates at approximately 100 to 250 rpms. The upper limit of the rotational velocity of the turret is dictated by imparting too much energy to the fluent mass 30 so that upon impingement with the vane 10, the surface of the vane 10 is damaged. Alternatively, a rotational speed which is too low imparts insufficient energy to the fluent mass 30 so insufficient material is removed from the surface and the desired surface texture is not obtained.

FLUENT MASS

The fluent mass 30 is employed within the barrel 20 so as to provide an impinging force upon the vanes 10 during rotation of the barrel. The parameters which define the preferred fluent mass 30 are determined by the process to be performed.

A. ROUGH CUT

In the rough cut process, the fluent mass 30 is chosen so that upon addition of the abrasive material, sufficient removal of material is removed from the surface of the vane 10 so as to remove milled or coarse sanding marks. Preferably, the rough cut produces a surface texture of approximately $11-27 \times 10^{-6}$ inches on the vane 20. In the rough cut process, the individual particulates 32 of the fluent mass 30 may range from 0.0625 inches to 1.25 inches. Although the fluent mass 30 for the rough cut may be a randomly configured scientered ceramic, optimally, the range of particulate size for the rough cut process is from 4 mesh to $\frac{1}{8}''$ by $\frac{1}{4}''$ pyramidal. The ceramic fluent mass 30 may comprise an aluminum oxide and iron silicate compound. The preferred fluent mass 30 is Richwood Media No. 62, 63 or 64.

In terms of the functional parameters which define the size of the fluent mass 30 for the rough cut process, if the fluent mass particulates 32 are too large, too much energy is imparted to the fluent mass 30 so that the vane 10 is damaged when the fluent mass impinges the surface. In addition, if the size of the particulate 32 is too large, the surface texture of the vane 10 is above the desired level, in that the distance between areas of impingement of the fluent mass 30 and the vane 10 prevents the abrasive material 60 from removing a substantially uniform amount of material from the vane 10. Alternatively, if the particulates 32 are too small, insufficient energy is imparted to the fluent mass 30. When the particulates are too small and thereby too light, the inability to impart sufficient energy to the fluent mass prevents the fluent mass 30 from causing the abrasive material 60 to act upon the surface, thereby rendering the process ineffective.

The density of the fluent mass 30 for the rough cut process may range from 10 to 300 lbs./cubic ft., wherein the optimal range is from 85 to 150 lbs./cubic ft., and the preferred density of the fluent mass for the rough cut process is approximately 95 lbs./cubic ft.

B. REFINEMENT CUT

For the refinement cut, the size of the particulates 32 of the fluent mass 30 may range from 2 to 20 mesh, having an optimal range of 4 to 16 mesh, and the preferred range is from 4 to 12 mesh. Preferably, the particulates 32 are a random shaped scientered ceramic such as Richwood Media No. 8XM. The density of the fluent mass may vary from 10 to 300 lbs./cubic ft., with a preferred range from approximately 140 to 150 lbs./cubic ft. Preferably, the particulates 32 are such that sufficient energy is imparted so as to provide enough energy to the abrasive material 60 so as to remove material from the surface of the vane 10. In addition, the refinement cut fluent mass 30 should have a sufficient mass so that, as the abrasive material 60 is pulverized, the vane is burnished.

C. COLOR CYCLE

For the color cycle, the range in size of the particulates 32 may be from 2 to 36 mesh, wherein the preferred size is 8 mesh. The particulates 32 are also a scientered ceramic such as Richwood Media No. 8XM. The density of the fluent mass 30 for the color cycle may range from 10 to 300 lbs./cubic ft., with a preferable density of approximately 140 to 150 lbs./cubic ft.

For each of the rough cut, refinement cut and color cycle, the fluent mass 30 may occupy from 30% to 90% of the barrel volume, wherein the optimal range is from 50% to 75% of the barrel volume. Preferably, approximately 65% of the barrel volume is occupied by the fluent mass. The relative volume of the fluent mass 30 is determined by the functional parameters, that if too little fluent mass is employed, the individual particulates of the fluent mass are imparted with too much energy so that as they impinge the vane, the surface is damaged. Alternatively, if too much fluent mass 30 is employed within the barrel, an insufficient energy is imparted to the particulates 32 so that the abrasive material 60 does not remove material from the surface of the vane 10 and desired surface texture is not achieved.

RACK

As shown in FIG. 6, the rack 40 allows for the fixturing of a plurality of vanes 10 relative to the barrel 22 and relative to the other vanes 10. The fixturing of the vanes 10 allows for the volume of fluent mass-to-vane ratio to be lowered, thereby permitting a larger number of vanes 10 to be processed in a given volume of fluent mass 30.

The rack 40 may secure the vanes 10 so that the root 18 is substantially protected. That is, upon movement of the fluent mass 30 relative to the rack 40, the root 18 of the vanes 10 is not exposed to the fluent mass 10. Alternatively, if it is necessary, or allowable, to provide a specific surface texture to the root 18, the rack 40 may engage the root 18 so that a substantial portion of the root is exposed. The exact configuration of the rack 40 as it engages the roots 18 is determined by the necessity of protecting or exposing the root.

Preferably, as shown in FIGS. 6 and 7, the rack 40 includes a pair of parallel struts 42 which are separated by a plurality of supports 44 having apertures 45 in opposing ends. The struts 42 include spaced apertures 46, 47, sized to receive a pin 48, 49, respectively. In addition, the rack 40 may include legs 52 having apertures 57. To secure a vane 10 relative to the rack 40, the root 18 is disposed between adjacent supports 44. The supports 44 are secured by passing pin 48 through aperture 46 into aperture 45. As shown in FIG. 6, a plurality of vanes may be secured between adjacent supports 44 so that the vanes will not contact each other.

The rack 40 may be attached to a lid 22 of the barrel 20 so as to secure the vanes 10 relative to the barrel 20. Alternatively, the legs 52 may be secured to the struts 42 by passing pin 49 through aperture 47 into aperture 57. The legged rack may then be disposed or wedged between the lid and the bottom of the barrel so as to prevent motion of the rack 40 relative to the barrel 20.

ABRASIVES

During the rough cut and refinement cut steps, the abrasive material 60 is employed with the fluent mass 30 so as to remove material from the surface of the vane 10. Preferably, the abrasive material 60 comprises a fine powder which substantially adheres to the surface of the particulates 32 so that as the fluent mass 30 impinges the vane 10, the abrasive 60 is disposed between the surface of the vane and the fluent mass. The abrasive material 60 used in the rough and refinement cuts may range from 24 grit to 1600 grit, depending upon the surface texture prior to initiation of the disclosed method.

In terms of functional parameters, if the abrasive 60 is too coarse, too much material is removed from the surface of the vane 10 as the fluent mass 30 impinges the vane 10, thereby preventing the surface texture from achieving the desired smoothness. Alternatively, if the abrasive material 60 is too fine, insufficient material is removed from the surface during impingement of the fluent mass 30 and the vane 10 so that the process is inefficient. In addition, the amount of abrasive material 60 employed during the rough and refinement cuts affects the amount of material removed from the surface of the vane. For a given abrasive 60, the more abrasive that is employed during a cut, the more aggressive the abrasion of the vane 10.

Preferably, an abrasive of between 24-500 grit is employed in the rough cut. The abrasive material 60 for the rough cut may comprise aluminum oxide, silicon carbide, garnet, silica sand, boron carbide or fused aluminum oxide, with quantities of phosphate, borax, surfactants, inhibitors and non-ionic detergents so as to have a specific gravity of approximately 1.4 and a solubility in water of approximately 8%. A preferred abrasive material 60 for the rough cut is Richwood Compound No. 40 by Richwood Industries, Inc. of Garden Grove, Calif.

Preferably, the abrasive material 60 for the refinement cut includes an abrasive such as aluminum oxide, silicon carbide, garnet, silica sand, boron carbide, brown or white fused aluminum oxide having a grit from 150 to 1600, and soaps and detergents so as to form a powder which is substantially insoluble in water. The abrasive material 60 employed in the refinement cut provides two functions. Early in the refinement cut, the integrity of the abrasive material 60 is substantially constant so that material is removed from the surface of the vane 10. However, during the later portion of the refinement cut, the abrasive material 60 has been pulverized so that the abrasive material 60 is fractured into finer particles and, thereby, does not function to remove a substantial amount of material from the surface of the vane. The pulverized abrasive material 60 thereby burnishes the vane as a result of the impinging force of the fluent mass upon the vane. The burnishing of the vane 10 imparts compressive stresses to the surface so as to work harden the vane. A preferred abrasive material 60 for the refinement cut is Richwood Compound No. 42, as manufactured by Richwood Industries, Inc. of Garden Grove, Calif.

COLORING COMPOUND

During the rough cut and the refinement cuts, a coloring compound 70 is also employed. The use of the coloring compound 70 during the rough and refinement cut cleans the vane 10 so that efficient abrasion may be achieved. In addition, the coloring compound 70 acts to remove foreign matter from the surface of the vane 10 so that the material is not driven into the vane 10 when the fluent mass 30 impinges the surface. During the color cycle, the coloring compound 70 is employed without the abrasive material 60 so as to produce a highly reflective finish, thereby making any surface defects or flaws distinctive. Preferably, the coloring compound 70 comprises a mixture of wood flour, soaps, surfactants, water softening agents, tallow fatty acids and detergents, so as to have a specific gravity less than 0.5 and a water solubility of approximately 76%. A preferred coloring compound 70 is Richwood Compound No. 43, as manufactured by Richwood Industries, Inc. of Garden Grove, Calif.

LUBRICANT FLUID

A lubricating fluid 80 is employed during the rough cut, refinement cut and color steps to lubricate the surfaces of the fluent mass 30 and the vane 10. In addition, the lubricating fluid 80 dissipates heat generated by the friction between the fluent mass 30 and the vane 10. Further, the lubricating fluid 80 suspends the abrasive material 60 and coloring compound 70 so that they may be disposed between the fluent mass 30 and the surface of the vane 10 during the operations. The lubricating fluid 80 also suspends soils and foreign matter so as to prevent the redeposit of the material on the vane 10 or the impacting of the soils into the vane.

The amount of lubricating fluid 80 is dictated by the functional parameters in that if too little lubricating fluid is used, the operating temperature is increased, which may degrade the vane 10, the fluent mass 30, the abrasive material 60 or the coloring compound 70. Further, too little lubricating fluid 80 does not produce sufficient cleaning as the produced soils are not carried away from the surface of the vane 10. If the produced soils are not removed from the surface, the efficiency of the process is substantially reduced. Alternatively, too much lubricating fluid 80 retards the action of the fluent mass 30 so as to reduce the amount of energy imparted to the fluent mass, thereby preventing the abrasive from removing material from the surface of the vane 10.

It is preferable that the volume of lubricating fluid 80 range from approximately 2 inches below the level of the fluent mass 30 within the barrel 20 to approximately 2 inches above the level of the fluent mass 30 in the barrel 20, so that approximately 80 to 120% of the interstitial space of the fluent mass 30 is filled by the lubricating fluid 80. Preferably, a zero fluid level is employed, that is, approximately 100% of the interstitial space of the fluent mass is filled with the lubricating fluid 80. Although a variety of lubricating fluids or solutions may be employed, water is the preferred lubricating fluid.

OPERATION OF THE METHOD

A plurality of vanes 10 are fixtured within the rack so as to prevent relative motion of the vanes 10 relative to the rack. The racked vanes 10 are then disposed within the barrel 20, and the rack 40 is fixed with respect to the barrel 20.

The fluent mass is then added into the barrel 20 to occupy approximately 65% of the volume of the barrel. For the rough cut of a vane having a surface texture of approximately $40-50 \times 10^{-6}$ inches rms, the fluent mass 30 preferably comprises the preformed ceramic triangles of $\frac{5}{8}" \times \frac{1}{4}"$, such as Richwood Media No. 62, 63 or 64.

For the rough cut, an abrasive material 60, such as Richwood Compound No. 40, and the coloring compound 70, such as Richwood Compound No. 43, are added to the barrel. Preferably, approximately 1 cup of the Richwood Compound No. 40 and 1 cup of the Richwood Compound No. 43 are employed in the rough cut for a barrel 20 having a volume of approximately 1 cubic foot filled to approximately 65% with the fluent mass 30. Water as the lubricating fluid 80 is added to the barrel 20 so that the water level is substantially equal to the level of the fluent mass 30 within the barrel. The barrel 20 is then sealed with the lid 22 disposed in the turret, and the turret 22 is then rotated at approximately 150 rpms. Preferably, the abrasive material 60 and coloring compound 70 produce a viscous foam or lather upon rotation of the barrel 20 so as to cushion impact of the fluent mass 30 and the vane 10. If the surface texture of the vane 10 prior to the rough cut is approximately $40 \times 10^{-6}$ inches rms, the turret 22 is rotated for a period of 10 minutes. However, if the prior surface texture of the vane 10 is approximately $125 \times 10^{-6}$ inches rms, the period of rotation for the rough cut may be increased to approximately 50 minutes.

After rotation of the barrel 20 in the rough cut step, the barrel is opened and the fluent mass 30 is rinsed with a fresh water. The rinse involves twice the volume of the lubricating fluid 80. The rough cut yields a surface texture between $11-27 \times 10^{-6}$ inches rms. After the rinse, a volume of water equal to approximately 100% of the interstitial volume of the fluent mass 30 in the barrel 20.

Preferably, the scientered ceramic fluent mass 30, such as Richwood Media No. 8XM, is used to replace fluent mass 30 used in the rough cut, wherein approximately 65% of the barrel volume is filled with the new fluent mass. For the refinement cut, an abrasive material 60, such as Richwood Compound No. 42, and the coloring compound 70, such as Richwood Compound No. 43, are added to the barrel 20. Preferably, 1 cup of Richwood Compound No. 42 and 1 cup of Richwood Compound No. 43 are used in the refinement cut. The lubricating fluid is preferably at a zero water level. The barrel 20 is then sealed and rotated at approximately 150 rpm for a period of approximately 10 minutes. The refinement cut process yields a surface texture between $5-7 \times 10^{-6}$ inches rms. In addition, as the abrasive material 60 is pulverized during the refinement cut, the vane 10 is burnished by the impinging fluent mass 30 and the pulverized abrasive 60. After the refinement cut rotation, the fluent mass 30, Richwood Media No. 8XM, is then rinsed, and the water is replaced so that a zero water level remains in the barrel 20.

The coloring compound 70, such as Richwood Compound No. 43, is then added to the barrel. Preferably, 1 cup of Richwood Compound No. 43 is used for the color cycle. The barrel 20 is then sealed, and rotated for approximately 5 minutes at 100-150 rpm. The coloring cycle removes a nominal amount of material from the surface of the vane 10, such that the final surface texture is approximately 4-7 microinches rms.

After the coloring cycle, the rack 40 is removed from the barrel, and the vanes 10 are rinsed and released from the rack 40. The highly reflective surface texture of the vanes 10 permits the ready inspection of the vanes for surface defects, cracks or other flaws. In addition, the highly reflective finish provides a surface texture which exhibits a lower drag force than the surface texture of the prior art. The reduced drag force also lowers the operating temperature of the vanes 10, thereby prolonging the useful life of the components.

The fluent mass 30 is then discarded, and the process may be restarted for a new batch of vanes 10.

Although the present invention has been described in terms of particular embodiments, it is not limited to these embodiments. Alternative embodiments and modifications which would still be encompassed by the invention may be made by those skilled in the art, particularly in light of the foregoing teachings. Alternative embodiments, modifications and equivalents may be included within the spirit and scope of the invention as defined by the claims.

I claim:

1. An apparatus for providing a surface texture on a plurality of vanes, comprising:
   (a) a barrel sized to retain a plurality of vanes;
   (b) a rack sized to be received with the barrel, such that the rack is configured to secure a plurality of vanes within the barrel so as to substantially fix the vanes relative to the barrel;
   (c) a fluent mass movably received within the barrel so that the fluent mass occupies at least 30% of the volume of the barrel;
   (d) a lubricating fluid for substantially wetting the surface of the fluent mass;
   (e) an abrasive material for abrading the vanes as the fluent mass impinges the vanes so as to produce a surface texture of less than $10 \times 10^{-6}$ rms; and
   (f) centrifugal barrel finishing means for moving the barrel so that the fluent mass impinges the vanes.

2. An apparatus as defined in claim 1, wherein the fluent mass comprises particles with sizes in the range of 0.0625 inches to 1.25 inches, and wherein the density of the fluent mass is in the range of 10 to 300 pounds per cubic foot.

3. An apparatus as defined in claim 2, wherein the fluid mass particulates are pyramidal having sizes in the range of 4 mesh to $\frac{5}{8}"$ by $\frac{1}{4}$ inch pyramidal.

4. An apparatus as defined in claim 3, wherein the fluent mass has a density in the range of 85 to 150 pounds per cubic foot.

5. An apparatus as defined in claim 4, wherein the fluent mass occupies from 30% to 90% of the barrel volume.

6. An apparatus as defined in claim 4, wherein the fluent mass occupies from 50% to 75% of the barrel volume.

7. An apparatus as defined in claim 2, wherein the abrasive material is an abrasive in the range of 24 grit to 500 grit.

8. An apparatus as defined in claim 5, wherein the abrasive material is an abrasive in the range of 24 grit to 500 grit.

9. An apparatus as defined in claim 8, wherein the fluent mass occupies from 50% to 75% of the barrel volume.

10. An apparatus as defined in claim 1, wherein the fluent mass comprises particulates having sizes in the range of 2 to 20 mesh and wherein the density of the fluent mass is in the range of 140 to 150 per cubic foot.

11. An apparatus as defined in claim 10, wherein the fluent mass comprises particulates having sizes in the range of 4 to 16 mesh, and wherein the fluent mass occupies 30-90% of the barrel.

12. An apparatus as defined in claim 11, wherein the fluent mass comprises particulates having sizes in the range of 4 to 12 mesh, and wherein the fluent mass occupies 50-75% of the barrel.

13. An apparatus as defined in claim 10, wherein the abrasive material is an abrasive in the range of 150 grit to 1600 grit.

14. An apparatus as defined in claim 12, wherein the abrasive material is an abrasive in the range of 150 grit to 1600 grit and is substantially insoluble in water.

15. An apparatus as defined in claim 1, wherein the fluent mass has particulate sizes in the range of 2 to 36 mesh, with a fluent mass density of about 140 to 150 pounds per cubic foot.

16. An apparatus as defined in claim 15, wherein the fluent mass occupies from 50% to 75% of the barrel volume.

17. An apparatus as defined in claim 15, wherein the abrasive material has a specific gravity less than 5 and which is partially water soluble.

18. An apparatus as defined in claim 16, wherein the abrasive material has a specific gravity less than 5 and which is partially water soluble.

19. A method for providing a surface texture on a vane, comprising:
(a) securing the vane relative to a barrel;
(b) introducing a fluent mass into the barrel so that the fluent mass occupies at least 30% of the volume of the barrel;
(c) introducing an abrasive material to the fluent mass so that the abrasive material is substantially disposed on the fluent mass;
(d) introducing a lubricating fluid into the barrel to substantially wet the surface of the fluent mass; and
(e) moving the barrel in a centrifugal barrel finishing machine so that the fluent mass causes the abrasive material to impinge the blade so as to produce a surface texture of less than $10 \times 10^{-6}$ inches in less than 30 minutes.

20. A method as defined in claim 19, wherein the step of introducing a fluent mass comprises introducing particles with sizes in the range of 0.0625 inches to 1.25 inches and selected to have a density in the range of 10 to 300 pounds per cubic foot.

21. A method as defined in claim 20, wherein the step of introducing a fluent mass comprises introducing particles of a pyramidal shape with sizes in the range of 4 mesh to 1 5/8 " by ⅛inch pyramidal.

22. A method as defined in claim 21, wherein the step of introducing a fluent mass comprises introducing fluent mass sufficient to occupy from 30% to 90% of the barrel volume.

23. A method as defined in claim 21, wherein the step of introducing a fluent mass comprises introducing fluent mass sufficient to occupy from 50% to 75% of the barrel volume.

24. A method as defined in claim 20, wherein the step of introducing an abrasive material comprises introducing an abrasive in the range of 24 grit to 500 grit.

25. A method as defined in claim 28, wherein the step of introducing an abrasive material comprises introducing an abrasive in the range of 24 grit to 500 grit.

26. A method as defined in claim 19, wherein the step of introducing a fluent mass comprises introducing particulates having sizes in the range of 2 to 20 mesh and wherein the density of the fluent mass is selected to be in the range of 140 to 150 pounds per cubic foot.

27. A method as defined in claim 26, wherein the step of introducing a fluent mass comprises introducing particulates having sizes in the range of 4 to 16 mesh to occupy 30-90% of the barrel.

28. A method as defined in claim 27, wherein the step of introducing a fluent mass comprises introducing particulates having sizes in the range of 4 to 12 mesh to occupy 50-75% of the barrel.

29. A method as defined in claim 26, wherein the step of introducing the abrasive comprises introducing an abrasive in the range of 150 grit to 1600 grit.

30. A method as defined in claim 26, wherein the step of introducing the abrasive comprises introducing an abrasive in the range of 150 grit to 1600 grit and wherein the abrasive is selected to be substantially insoluble in water.

31. A method as defined in claim 19, wherein the step of introducing the fluent mass comprises introducing particles with sizes in the range of 2 to 36 mesh and selected to have a density of about 140 to 150 pounds per cubic foot.

32. A method as defined in claim 31, wherein the step of introducing the fluent mass comprises introducing sufficient fluent mass to occupy from 50% to 75% of the barrel volume.

33. A method as defined in claim 31, wherein the step of introducing abrasive material comprises introducing an abrasive material selected to have a specific gravity less than 5 and which is partially soluble in water.

34. A method as defined in claim 32, wherein the step of introducing abrasive material comprises introducing an abrasive material selected to have a specific gravity less than 5 and which is partially soluble in water.

35. A method as defined in claim 19, wherein the step of introducing lubricating fluid comprises the step of introducing an amount of lubricating fluid comprising 80 to 120% of any intersticial space in the fluent mass.

36. A method as defined in claim 24, wherein the step of introducing lubricating fluid comprises the step of introducing an amount of lubricating fluid comprising 80 to 120% of any intersticial space in the fluent mass.

37. A method as defined in claim 29, wherein the step of introducing lubricating fluid comprises the step of introducing an amount of lubricating fluid comprising 80 to 120% of any intersticial space in the fluent mass.

38. A method as defined in claim 25, wherein the step of introducing lubricating fluid comprises the step of introducing an amount of lubricating fluid comprising 100% of any intersticial space of the fluent mass.

39. A method as defined in claim 30, wherein the step of introducing lubricating fluid comprises the step of introducing an amount of lubricating fluid comprising 100% of any intersticial space of the fluent mass.

* * * * *